United States Patent Office 3,112,173
Patented Nov. 26, 1963

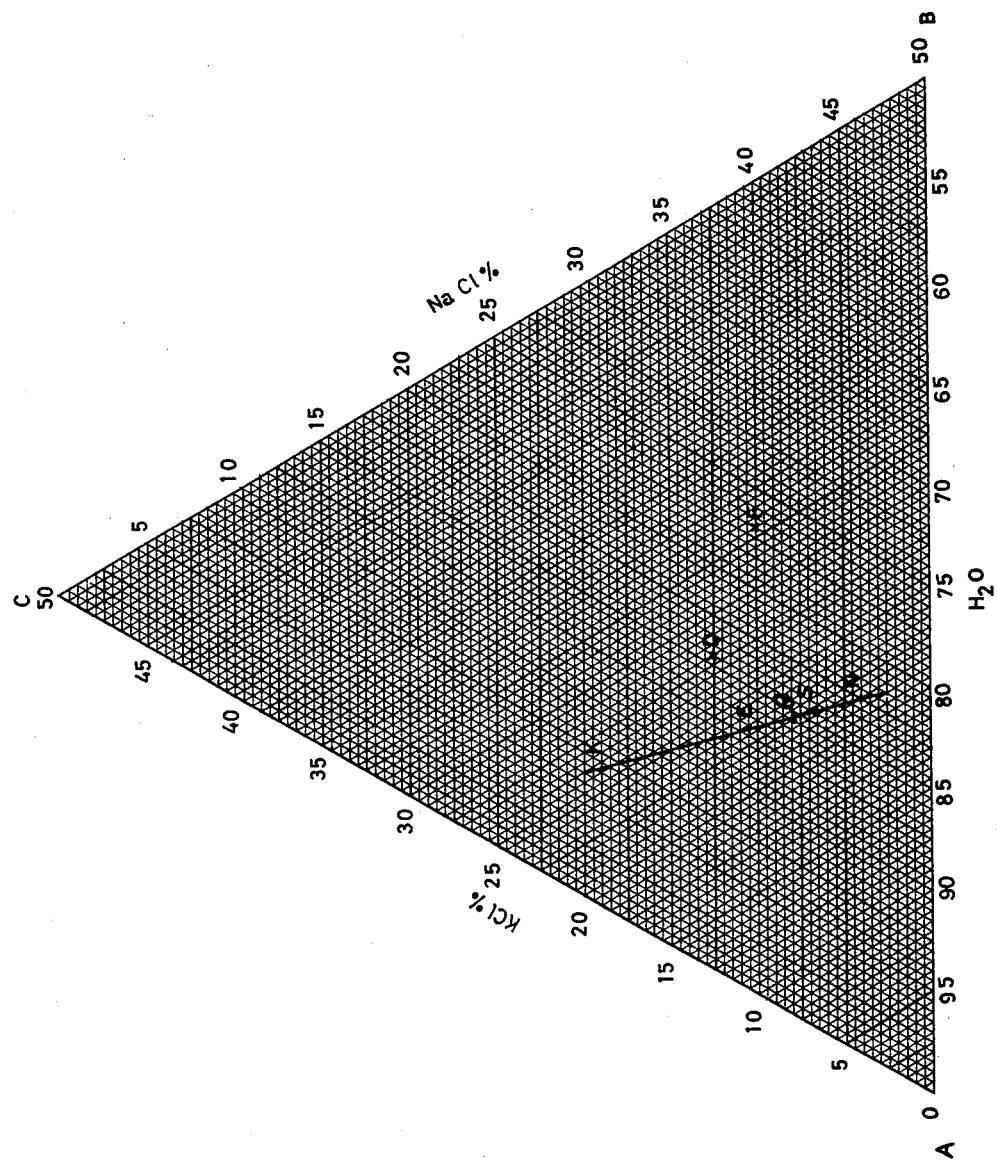

3,112,173
SEPARATE PRECIPITATION OF SODIUM AND POTASSIUM BICARBONATE FROM SODIUM CHLORIDE-POTASSIUM CHLORIDE SOLUTIONS
Friedrich Wolstein, 45 Meterstrasse, and Gustav Gelhaus, 1 Gartnerweg, both of Hannover, Germany
Filed July 12, 1961, Ser. No. 123,538
Claims priority, application Germany July 13, 1960
4 Claims. (Cl. 23—64)

The invention relates to the separate recovery of sodium bicarbonate and potassium bicarbonate from solutions containing sodium chloride and potassium chloride.

It has long been known to make potassium bicarbonate by a process analogous to the Solvay process by reacting potassium chloride with carbon dioxide and replacing the ammonia with an amine. In application Ser. No. 79,534, filed December 30, 1960, for Manufacture of Potassium Bicarbonate, such a method has been disclosed where triethylamine is added to an aqueous solution of potassium chloride, carbon dioxide is introduced into the mixture with vigorous stirring, and the precipitated potassium bicarbonate is separated from the mother liquor.

In such amine precipitation methods, difficulties arise when not pure potassium chloride but a crude potassium salt containing sodium chloride, such as sylvinite, is used as starting material. In such a case, particularly when the salt contains more than about 3 percent of sodium chloride, sodium bicarbonate is precipitated together with the potassium bicarbonate because the sodium bicarbonate is less soluble in water than the potassium bicarbonate.

We have found that better yields and a better separation of sodium and potassium are achieved in the precipitation of the bicarbonates by means of an amine as carbon dioxide transfer agent when a certain ratio of water to chloride is maintained in the solution. The ratio of NaCl:KCl in the solution has no influence in this respect.

Optimum yields are obtained when the required water-chloride ratio is maintained and when the precipitation of the bicarbonates is carried out with triethylamine and $CO_2$, whereby the bicarbonates are obtained in a particularly pure state. In order to precipitate first pure sodium bicarbonate, it is of advantage to apply 1 to 1.2 moles, preferably 1.2 moles of triethylamine and the corresponding mole of $CO_2$ per 1 mole of NaCl.

The water concentration to be maintained must be taken from the attached drawing representing the $H_2O$—NaCl—KCl diagram. The invention is defined by the line N—K of said diagram which represents the optimum water concentration for any given NaCl:KCl ratio for separate precipitation of the bicarbonates where 1–1.2 moles of triethylamine and the corresponding amount of $CO_2$ per mole of NaCl are first used for the precipitation of sodium bicarbonate. The remaining potassium is then similarly precipitated with triethylamine and $CO_2$. The use of the diagram is best illustrated by the following comparative example which shows that any deviation of the line N—K results in the precipitation of an $NaHCO_3$ which is contaminated with $KHCO_3$. All percentages are given by weight.

Example 1

(a) 90.5 g. of sylvinite (45.0% KCl; 55% NaCl) were dissolved in 230 g. of water to a solution containing 15.6% of NaCl, 12.6% of KCl and 71.8% of water. 104.0 g. of triethylamine (corresponding to 1.2 moles calculated for 50 g. NaCl) were added. After $CO_2$ had been introduced for 3 hours, 70 g. of $NaHCO_3$ had been precipitated which contained 7% of potassium.

The used ratio of 15.6% NaCl, 12.6% KCl, and 71.8% $H_2O$ corresponds to point D on the diagram which is not located on the line K—N.

(b) The same amount of sylvinite was dissolved in 300 g. of $H_2O$, thereby obtaining a solution containing 10.4% KCl, 12.9% NaCl, and 76.7% water, which corresponds to point E on line K—N of the diagram. In this case, the same amounts of triethylamine and $CO_2$, under the same conditions as under (a), precipitated 69 g. of $NaHCO_3$ which contained only 0.13% of potassium.

The example shows that any deviation from the line K—N of the ternary system results in a loss of pure $KHCO_3$ and corresponding contamination of the obtained $NaHCO_3$.

If, for instance, it is desired to remove from a sylvinite consisting of 30% KCl and 70% NaCl, the sodium in the form of bicarbonate, it is first necessary to determine on the diagram the point for the ratio of KCl:NaCl= 30:70=10:23.3, which is point F. The intersection of the line A—F with the line N—K gives the required optimum water concentration according to the invention, which is 77.7%. Therefore, if 100 g. of sylvinite are used, they must be dissolved in 349 g. of $H_2O$. This gives a solution of 15.6% NaCl, 6.7% KCl, and 77.7% of $H_2O$; to this solution, 145 g. of triethylamine are added. If $CO_2$ is introduced into said solution for 3 hours, 96.5 g. of sodium bicarbonate are obtained which contain only 0.14% of potassium. After separating the mother liquor from the sodium bicarbonate precipitate the mother liquor can be treated with triethylamine and $CO_2$ to precipitate potassium bicarbonate, whereby preferably about 1 to 1.5 moles of triethylamine and the corresponding amount of $CO_2$ are applied for each mole of potassium chloride. Instead of applying separately corresponding mole amounts of triethylamine and $CO_2$, preformed triethylamine bicarbonate may be added to the KCl solution with stirring to precipitate $KHCO_3$. The same applies to the above described precipitation of $NaHCO_3$.

In the case sodium bicarbonate shall be recovered from natural sylvinites, it is recommended to remove the greatest deal of the magnesium sulfate contamination before the bicarbonate precipitation.

Our novel separation process makes it possible to increase the yield of sodium bicarbonate, calculated on the sodium chloride, compared with known procedures, while the contamination with potassium is considerably reduced. At the same time, the purity of the obtained potassium bicarbonate is considerably improved.

The yield of bicarbonate and at the same time the contamination of the precipitate is lowered when shifting the line N—K parallel to the left, whereas on parallel displacement to the right yield and contamination will increase. Such shifting within reasonable limits, which in view of the desired purity is tolerable, is within the scope of the claimed invention.

Example 2

107.5 kg. sylvinite with 18.6% KCl were dissolved in 396 liters of water to a solution containing 17.4% sodium chloride, 4.0% potassium chloride and 78.6% water (corresponding to the point N of the diagram). To this solution 181 kg. triethylamine were added and $CO_2$ introduced in a stoichiometric amount corresponding to the triethylamine. After about three hours, 106 kg. sodium bicarbonate (=84.5% of theory) were recovered which contained 0.3% potassium.

Example 3

For recovery of the potassium still contained in the remaining mother liquor of Example 2, 35.2 kg. triethylamine (=1.3 moles based on KCl) were added and $CO_2$ was introduced for about 3 hours. 22.5 kg. KHCO₃ precipitated (=84% of theory) of a purity of 98%.

For the recovery of the triethylamine contained in the remaining mother liquor in the form of triethylammoniumchloride lime is added to the mother liquor. The triethylamine which is obtained by this reaction forms a second phase on the water.

The separated ethylamine could be easily decanted without applying heat, or it could be recovered by azeotropic distillation at 75.8° C.

*Example 4*

91.1 kg. sylvinite (KCl-content 33.6%) were dissolved in 310 liters of water. To this solution which contained 15.1% NaCl, 7.6% KCl and 77.3% water (corresponding to point G of the diagram), 125 kg. triethylamine were added. After introducing $CO_2$ into this solution for three hours, 75 kg. (=86.5% of theory) sodium bicarbonate were obtained and then separated from the mother liquor. The sodium bicarbonate was contaminated with only 0.14% potassium.

*Example 5*

The sodium bicarbonate which was obtained according to Example 4 was separated and to the mother liquor 53.4 kg. triethylamine—which is 1.3 moles based on KCl—were added and for three hours $CO_2$ was introduced. 37 kg. KHCO₃ (=82.8% of theory) were obtained with a purity of 98%.

The temperature of the bicarbonate precipitation is not critical because in general the reaction mixture reaches a temperature of about 45–55° C., the reaction being exothermic. In the foregoing examples a reaction temperature of 45–55°, preferably 50° C., was used.

We claim:

1. A method for the recovery of pure sodium bicarbonate from aqueous solutions containing sodium chloride and potassium chloride comprising preparing a solution containing water as a function of the NaCl:KCl ratio in an amount defined by the line N—K of the triangular KCl—NaCl—H₂O diagram of the drawing, adding to said solution 1 to 1.2 moles each of triethylamine and $CO_2$ per mole of NaCl, thereby precipitating pure sodium bicarbonate, and separating said sodium bicarbonate from the mother liquor.

2. The method as claimed in claim 1 comprising the additional step of adding to the separated mother liquor about 1.1 to 1.5 moles of triethylamine per mole of KCl, introducing into said mixture carbon dioxide, and separating the precipitated potassium bicarbonate from the mother liquor.

3. The method as claimed in claim 1 comprising precipitating the bicarbonates by adding to the solution of the chlorides triethylamine bicarbonate with stirring and recovering the bicarbonate precipitate.

4. A process as claimed in claim 1 comprising using as starting material a natural sylvinite.

References Cited in the file of this patent

UNITED STATES PATENTS

| | | |
|---|---|---|
| 2,752,222 | Birman | June 26, 1956 |
| 2,782,093 | Hulot et al. | Feb. 19, 1957 |
| 2,900,232 | Lafont | Aug. 18, 1959 |
| 2,905,529 | Rubin et al. | Sept. 22, 1959 |